United States Patent [19]
Loriot

[11] Patent Number: 5,727,763
[45] Date of Patent: Mar. 17, 1998

[54] DEVICE FOR BALANCING THE FORCES ACTING ON AN ARM PULLED BY A LOAD

[76] Inventor: Jean-Marc Loriot, 15, rue Lakanal, F 75015 Paris, France

[21] Appl. No.: 561,006

[22] Filed: Nov. 21, 1995

[30] Foreign Application Priority Data

Nov. 25, 1994 [FR] France .................... 94 14178

[51] Int. Cl.⁶ .................................................. A47H 1/10
[52] U.S. Cl. ............................... 248/325; 248/123.2
[58] Field of Search ......................... 248/325, 323, 248/324, 327, 328, 317, 351, 354.1, 123

[56] References Cited

U.S. PATENT DOCUMENTS 4,666,364   5/1987   Doege et al. ............... 248/325 X

FOREIGN PATENT DOCUMENTS

| 2565153 | 12/1985 | France . |
| 2627718 | 8/1994 | France . |
| 735274 | 5/1943 | Germany . |
| 57-091885 | 6/1982 | Japan . |
| 1240837 | 7/1971 | United Kingdom ............ 248/325 |

*Primary Examiner*—Ramon O. Ramirez
*Attorney, Agent, or Firm*—Spencer & Frank

[57] ABSTRACT

A device for balancing forces acting on an arm pulled by a load includes a body on which is pivotally mounted an arm pulled by a load. The body is suspended from a point of support by an adjustable, triangular support connected at two fixing points on the body, which allows adjustment of the center of gravity of the device, in order that it is in substantial vertical alignment with the point of support when the arm is in an intermediate, substantially horizontal position. The arm may support a tool, such as a welding tool.

11 Claims, 1 Drawing Sheet

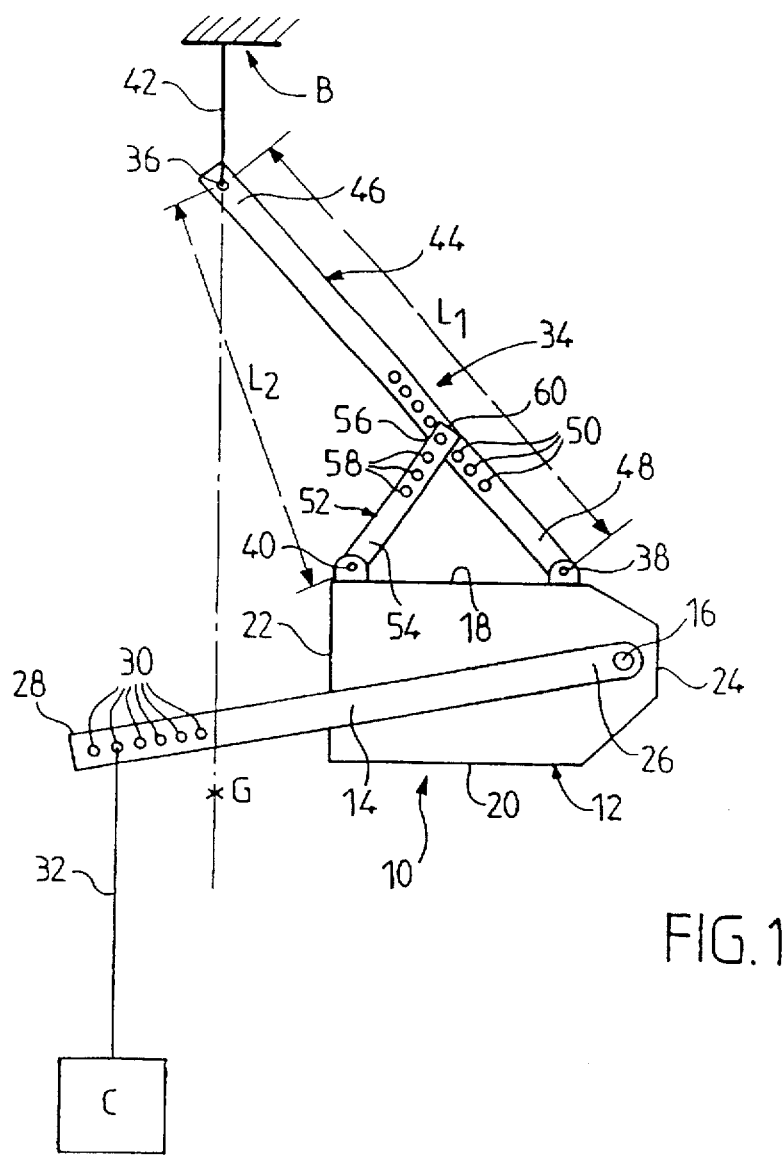
FIG. 1
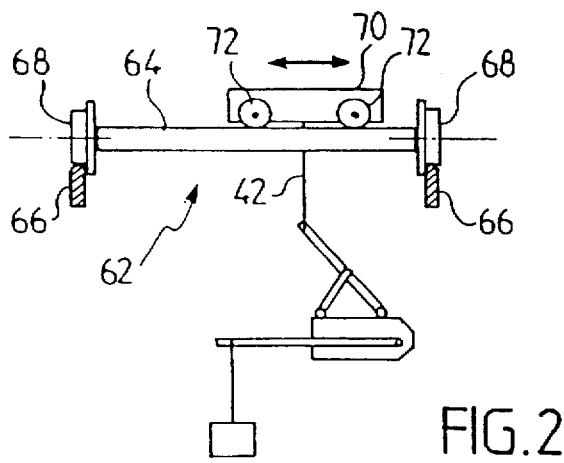
FIG. 2
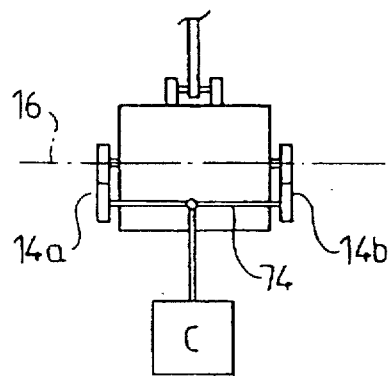
FIG. 3
FIG. 4

DEVICE FOR BALANCING THE FORCES ACTING ON AN ARM PULLED BY A LOAD

BACKGROUND OF THE INVENTION

The invention relates to a device of the kind for balancing forces acting on an arm pulled by a load, the device comprising a body on which the arm is pivoted for rotation about an axis, particularly a horizontal axis.

French patents Nos. 84 08383 and 88 02423 show devices of the kind set forth which allow the balancing of forces, particularly weight acting on the arms of robots or the like.

Such devices are used in particular for balancing the forces acting on an arm pulled by a load such as a tool. They allow an exact balancing of the arm to be obtained with the possibility of a large angular deflection of the arm.

The load may be a tool, such as a welding tool, used on vehicle assembly lines. In this case the operator can displace the tool practically without effort since the balancing device balances the forces which act on the arm, whatever the angular position of the arm about its pivotal axis which is generally horizontal.

In known balancing devices, the body of the device, on which the arm is pivoted, has been mounted in a fixed position. This known solution poses a number of problems, in particular the ability to adjust the device, which must take into account the value of the load which pulls the arm.

Another disadvantage of this known solution is that it limits the possibility of horizontal movement of the device, both of translational and rotational movement, which is not desirable in the case where the load is a tool which the operator must be able to move in the three directions in space.

SUMMARY OF THE INVENTION

The aim of the invention is in particular to overcome the preceding disadvantages.

According to the present invention, in a device of the kind set forth in the preceding section of this document, the body has first and second fixing points spaced in a horizontal plane and in a direction perpendicular to the axis of the arm, the body being suspended from a point of support by an adjustable triangular support connected to the first and second fixing points, the distance between the point of support and each of the first and second fixing points being adjustable, the arrangement being such that the center of gravity of the device, including the arm and the load, is in substantial vertical alignment with the point of support when the arm is in an intermediate substantially horizontal position.

The invention provides a suspended mounting for the device in relation to a point of support, and allows the adjusting of the centre of gravity of the whole device to be vertically aligned with the point of support.

It has been established that such a mounting surprisingly has a number of advantages in use in comparison with the prior art.

In the majority of cases, the arm of the device is pivoted about a horizontal axis and can move angularly to one side or the other of a central position, which is advantageously horizontal.

In the usual range of utilization of the device, that is to say approximately ±30° to the horizontal, the adjustable mounting ensures that the body of the device stays substantially horizontal and is extremely easy to control in use.

Beyond this range of utilization, the body of the device inclines slightly, causing a slight imbalance which increases the movement. If the movement is upwards the load tends to rise, if downwards the load tends to fall.

The feature which gives a sufficiently large range of utilization is an advantage because it gives a range of positions for the load. This is particularly advantageous when the load is a tool because the tool disengages into the work zone. A light pressure applied to the tool is sufficient to bring it into the work zone.

Further, the use of an adjustable triangular support allows the position of the body of the device to be adapted in relation to the height available below the ceiling on the site.

In one embodiment of the invention, the adjustable triangular support comprises a first bar of adjustable length connected to the point of support and to the first fixing point on the body and a second bar of adjustable length connected to the second fixing point of the body and to an intermediate point of anchorage on the first bar.

This embodiment is particularly simple, and with a triangular support, allows easy mounting and adjusting on site.

In this embodiment, a central portion of the first bar preferably has several spaced holes, in order to allow an adjustable connection to the second bar.

The second bar advantageously has several holes at one of its ends in order to allow an adjustable connection to the first bar.

In order to adjust the length of the first bar one of its ends may have spaced holes and/or the bar may be cut to the desired length.

In this embodiment the point of support is attached to the end of a suspended cable. This offers very appreciable possibilities of movement, in particular for rotation and for lateral movements of small amplitude.

In a modification, the support point is in the form of a universal joint, for example the Cardan type, offering comparable possibilities of movement but of smaller amplitude than in the preceding case.

The point of support may be fixed, directly or indirectly, to a displacement mechanism adapted to provide movement in two horizontal, perpendicular directions. The device can thus be attached to a Cartesian displacement mechanism, which when combined or not with means allowing rotation and/or displacements of small amplitude, offers excellent possibilities of lateral displacements.

The arm may also include means to adjust the distance between the attachment of the load and the pivotal axis of rotation.

In one embodiment, the adjustment means comprises a series of spaced holes at different distances from the pivotal axis of rotation.

In an advantageous method, the arm is double and comprises two parallel bars connected by an axis for attachment for the load. This results in a better balancing of the whole device since the application of the load can be in the median plane of the body of the device.

BRIEF DESCRIPTION OF THE DRAWINGS

Embodiments of the invention are illustrated, by way of example, in the accompanying drawings, in which:

FIG. 1 is a side view of a balancing device in accordance with the invention in which the arm is pulled by a load, such as a tool;

FIG. 2 is a side view of a device in accordance with the invention fixed to a displacement mechanism with crossing movements; and FIG. 3 is a side view of a device in accordance with the invention with a universal joint at its point of support; and FIG. 4 is an end view of the body of the device in a form of construction where the arm is double.

DESCRIPTION OF THE PREFERRED EMBODIMENTS

FIG. 1 shows a balancing device 10 in accordance with the invention consisting of a body 12 on which is pivoted an arm 14 about an axis of rotation 16 which is substantially horizontal.

The body 12 has a generally elongated configuration and consists of a top face 18, a bottom face 20, and two opposed end faces 22 and 24.

The pivotal axis 16 is situated close to the end face 24, and the arm 14 consists of a first end 26 pivoted on the axis 16 and a second end 28 which, in the position shown, extends beyond the end face 22 of the body 12.

The body 12 houses balancing means (not shown) which can be identical or similar to those described in French patents 84 08383 or 88 02423, to which reference can be made for further information.

The end 28 of the arm 14 has a series of spaced holes 30 situated at different distances from the pivotal axis 16. It is possible therefore to fix to the arm 14 a load C, for example a tool, by means of a connection 32.

When the device 10 is adjusted, it allows an exact balance of the arm to be obtained, whatever the angular position may be, to one side or the other of an intermediate position, in which the arm is substantially horizontal.

In accordance with the invention, the device 10 is suspended from a structure B by a triangular support 34, which is fixed, at one end to a point of support 36 and, at the other end to first and second fixing points 38 and 40 on the body 12. The fixing points 38 and 40 are spaced from each other in a horizontal plane and in a direction substantially perpendicular to the axis 16.

In the example, the point of support 36 is fixed to structure B by a cable 42.

The triangular support comprises a first bar 44 having a length L1 which can be adjusted, for example by cutting the bar to the desired length or by a plurality of holes (not shown) in at least one of the two ends. The first bar 44 also has several spaced holes 50, situated in its central region.

The support 34 further comprises a second bar 52 of which an end 54 is fixed to the fixing point 40 and of which the other end 56 has several spaced holes 58 in order to allow adjustable fixing to the first bar 44 by an axis 60 passing through one of the holes 50 and one of the holes 58.

By these adjustments, the length L1 of the bar 44 which corresponds to the distance between the point of support 36 and the first fixing point 38 can be modified, as can the length L2 which corresponds to the distance between the point of support 36 and the second fixing point 40.

In accordance with the invention, the support 34 is adjusted such that the center of gravity of the device, arm and load included, is substantially vertically aligned with the point of support 36 when the arm 14 is in a substantially horizontal position.

This results in the advantage already mentioned, for use of the device. In the range of usual utilization corresponding to an angle of ±30° to the horizontal, the body 12 stays in a substantially horizontal position and is extremely easy to control in use.

Beyond this range of utilization, the device can incline itself slightly providing a slight imbalance, as already mentioned.

Using a cable 42 to connect the support 44 to structure B means that there are various possibilities of movement, notably rotation and lateral movements of small amplitude.

The device shown in FIG. 2 is identical to that in FIG. 1, except that the cable 42, instead of being connected to a fixed structure, is connected to a displacement mechanism 62 allowing movements in two horizontal, perpendicular directions, that is to say an XY type Cartesian mechanism.

This mechanism consists of a carriage 64 movable translationally on two horizontal rails 66, by wheels 68. The carriage 64 supports apparatus 70 translationally movable in a direction perpendicular to that of the rails 66, by means of wheels 72.

The use of a Cartesian mechanism increases the possibilities of lateral displacements of the device and consequently of the load it supports. This is a particular advantage where the load is a tool which the operator must displace in the three directions of space.

The device shown in FIG. 3 is also identical to that in FIG. 1, except that the device is suspended from a structure via a rod and a universal joint 73 at a point of support.

In the modification of FIG. 4 the arm 14 of the device comprises two bars 14a and 14b, pivoted on the axis 16. The bars 14a and 14b are parallel and connected by an axis 74 serving to attach the load C.

The invention is not limited to the forms of construction previously described by way of an example and it extends to other variations. Thus, the triangular support can have numerous variations in construction, as long as it allows adjustment of the distances between the point of support and the two fixing points of the body of the device. It could for example comprise two rods, each having a mechanism for adjusting the length such as a stretching type or similar arrangement.

The invention finds application particularly in the displacement of a load and especially a tool, for example a welding tool, used on a vehicle assembly line.

What is claimed is:

1. A device for balancing forces acting on an arm pulled by a load, comprising a body on which said arm is pivoted for rotation about an axis, wherein said body has first and second fixing points spaced in a horizontal plane and in a direction perpendicular to said axis of said arm, said body being suspended from a point of support by an adjustable triangular support connected to said first and second fixing points, the distance between said point of support and each of said first and second fixing points being adjustable, the arrangement being such that the centre of gravity of said device, including said arm and said load is in substantial vertical alignment with said point of support when said arm is in an intermediate substantially horizontal position.

2. A device as claimed in claim 1, wherein said arm of said device is pivoted about a horizontal axis.

3. A device as claimed in claim 1, wherein said adjustable triangular support comprises a first bar of adjustable length connected to said point of support and to said first fixing point of said body and a second bar of adjustable length connected to said second fixing point of said body and to an intermediate point of anchorage on said first bar.

4. A device as claimed in claim 3, wherein a central portion of said first bar has several calibrated, spaced holes to allow an adjustable connection with said second bar.

5. A device as claimed in claim 3, wherein said second bar has several holes in one of its ends in order to allow an adjustable connection to said first bar.

6. A device as claimed in claim 1, wherein said point of support is attached to the end of a suspended cable.

7. A device as claimed in claim 1, wherein said point of support comprises a universal joint.

8. A device as claimed in claim 1, wherein said point of support is fixed to a displacement mechanism adapted to provide movement in two horizontal, perpendicular directions.

9. A device as claimed in claim 1, wherein said arm has means for adjusting the distance between the attachment of said load and said pivotal axis of said arm.

10. A device as claimed in claim 9, wherein said adjusting means comprises a series of spaced holes at different distances from said pivotal axis of said arm.

11. A device as claimed in claim 1, wherein said arm is double and comprises two parallel bars connected together by an axis for attachment of said load.

* * * * *